United States Patent [19]
Brown

[11] 3,760,869
[45] Sept. 25, 1973

[54] METHOD OF THERMAL EXHAUST AND SYSTEM THEREFOR

[75] Inventor: Dale H. Brown, Scotia, N.Y.

[73] Assignee: General Electric Company, Schenectady, N.Y.

[22] Filed: Apr. 22, 1971

[21] Appl. No.: 136,405

[52] U.S. Cl. .................................... 165/30, 165/122
[51] Int. Cl. ............................................ F25b 29/00
[58] Field of Search ............................ 165/30, 122; 261/DIG. 11; 110/8 A

[56] References Cited
UNITED STATES PATENTS
3,488,960  1/1970  Kirkpatrick ................ 261/DIG. 11

*Primary Examiner*—Charles Sukalo
*Attorney*—Paul A. Frank, John F. Ahern, Julius J. Zaskalicky, Frank L. Neuhauser, Oscar B. Waddell and Joseph B. Forman

[57] ABSTRACT

The altitude of rise of plumes of gases discharged into the atmosphere from the exhaust ports of chimneys is increased by the provision of means to heat the hot gases in the chimney to augment the thermal energy thereof.

2 Claims, 10 Drawing Figures

INVENTOR
DALE H. BROWN

METHOD OF THERMAL EXHAUST AND SYSTEM THEREFOR

The present invention relates to gaseous exhaust systems for continuously discharging gases into the atmosphere surrounding the earth and in particular to means for augmenting the height to which the plumes of gas from such discharges rise.

One type of such exhaust system is a cooling tower which is used in connection with the steam turbines of electric power plants for cooling the steam directly by heat exchange action or indirectly by cooling the water used for cooling the steam in the heat exchangers of the system. Two types of such cooling towers are commonly used, one known as the dry tower and the other known as the wet tower. In the dry cooling tower the cooling water flows in a closed and conservative cycle. In the wet cooling tower the warm water from the heat condenser is cooled by evaporative action as well as convective action of the air circulated through the tower. In cooling towers of the wet variety, there is provided a plurality of packing or heat exchange elements on which the water to be cooled is sprayed, dripped, or flowed and through which the cooling air is passed from an inlet port to an outlet port. The cooling air is heated and becomes saturated with water as it passes through the packing. The temperature of the air leaving the tower is higher than the temperature of the surrounding air and accordingly it rises. As the plume rises it causes ambient air to flow towards it and become entrained with it thereby increasing its mass and volume as it moves upward.

As the heated air moves upward it moves outward as well to form a plume of diameter increasing with height. At some height the upward propelling buoyancy forces of the atmosphere on the plume at that height is zero, i.e., the atmospheric air displacement is equal in weight to the weight of the gases of the plume. Such height is referred to as the minimum or zero buoyancy height of the plume. However, as the gases in the plume have a certain velocity or momentum at that height they continue to rise until the momentum is dissipated. The height at which the momentum of the plume gases is zero is referred to as the maximum or momentum height of the plume. Between the minimum and maximum height planes of the plume the gases thereof spread out in the horizontal direction and become dissipated and diffused into the surrounding atmosphere.

It is highly desirable to dissipate the exhaust gas and in particular the heat associated therewith in locations remote from the location of the cooling tower. In the vicinity of metropolitan areas where temperature inversion layers occur in which cold air is entrapped by a layer of warm air which may occur anywhere in the range of 500–1000 feet above ground, it is important for the thermal and other exhaust gases from stacks in the area such as from refineries and smelters to be dissipated above or through the thermal inversion layer, otherwise the discharge is contained within the entrapped colder air and contaminates it. To achieve such an objective, natural draft towers of considerable height have been utilized. Such towers have been made high to assure that the exhaust therefrom rises to a sufficient height so that air flows at such height move and dissipate the exhaust gases at points remote from the location of the tower. The basic objection to natural draft cooling towers which typically are 300–450 feet high is that they dominate the visual landscape. Also towers of such height are difficult to design to withstand high winds and are expensive. In cases of severe temperature inversions even high towers are not effective in discharging the exhaust gases above the temperature inversion layer. In some cases, forced draft towers using high velocity exhaust have been utilized to raise the height of the plume. In such cases without a high rise chimney, the heated plumes rise only short distances and exhaust discharges occur in the form of fog in the vicinity thereof. Towers of the natural draft and forced draft variety are described in an article on page 19 of the Mar. 25, 1968 issue of ELECTRICAL WORLD by William C. Davidson, entitled "Tower's Cooling Doubled by Fan-Assisted Draft".

Accordingly, an object of the present invention is to provide improvements in exhaust towers of the natural draft and forced draft variety.

Another object of the present invention is to provide means for substantially augmenting the height to which plumes of exhaust gas from vertically oriented exhaust ports extend without the need for utilizing towers of substantial height.

Another object of the present invention is to provide improved means for disposal into the atmosphere of thermal exhaust from power stations.

Another object of the present invention is to provide means for ventilating the air over areas in which cold air is entrapped by a layer of warm air.

Another object of the present invention is to provide economical means for increasing the height to which exhaust gases discharged into the atmosphere extend.

A further object of the present invention is to provide means for penetrating temperature inversions of the atmosphere of extreme characteristics in terms of the temperature gradient thereof and the height to which the temperature inversions extend.

The features of my invention which I desire to protect are pointed out with particularity in the appended claims. The invention itself, however, both as to its organization and method of operation together with further objects and advantages thereof may best be understood by reference to the following description taken in connection with the accompanying drawings wherein:

Figure 1:
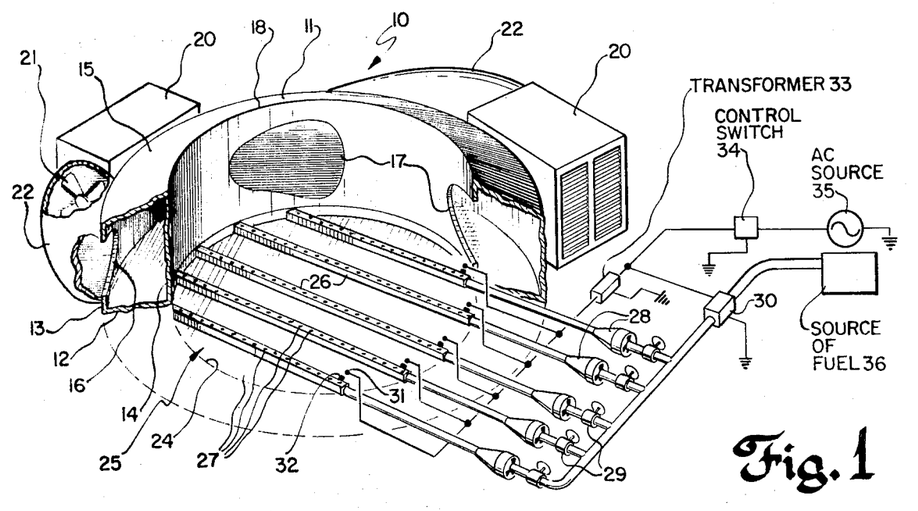
FIG. 1 shows a perspective view of a cooling tower assembly in accordance with one embodiment of the present invention.

Reference is now made to FIG. 1 which shows a perspective view of a cooling tower assembly 10 for cooling the cooling water used in steam condensation in electric power plants. The cooling tower assembly 10 is cut away to show the heating means 25 therein for augmenting the thermal energy of the exhaust gases from the tower assembly. The cooling tower assembly of FIG. 1 without the heating means 25 is described and claimed in a copending patent application Ser. No. 131,980, filed April 7, 1971, and assigned to the assignee of the present invention. In assembly 10 there is shown a toroidal shaped housing member 11 including a base member 12, outer wall member 13, an inner wall member 14, and an upper wall member 15. The outer wall member 12 is a section of a cylinder having a plurality of inlet openings 16 located about the circumference thereof. The inner wall member 14 is also cylindrical in form and also has a plurality of openings 17 therein. The upper wall member 15 which may be aerodynamically shaped to minimize wind resistance closes the space between the base, inner and outer wall members to form a toroidal shaped chamber or plenum. Adjacent each of the openings is provided a respective wet cooling tower 20 into which water from the cooling system of an electric power generator plane (not shown) is applied and through which air flows by action of a fan 21 associated with the cooling tower for drawing air therethrough. A plurality of ducts 22 are provided, each duct connecting the outlet of a respective wet cooling tower to a respective inlet opening. Each of the wet cooling towers 20 are conventional units and may be units such as manufactured by The Marley Company of Kansas City, Missouri and called "Water Cooling Towers". Such towers are well known in the art for the purpose of cooling the water utilized in the steam condenser systems of electric generating plants by heat exchange action with air flowing through the tower. The air from each of the cooling towers is warmed to a temperature above the temperature of the surrounding atmosphere. The air from the towers is mixed in the plenum or toroidal chamber of housing member 11 to provide air of relatively uniform temperature. The mixed hot air then passes through the openings 17 in the inner wall member into the central stack or chimney formed by the inner wall member 14 and out the exhaust opening or port 18 thereof.

The heating means for augmenting the thermal energy of the exhaust gas from the tower assembly is shown in the form of a combustor or burner assembly 25 including a plurality of longitudinal burner elements 26. Each of the burner elements 26 is in the form of a hollow tube having a plurality of small holes 27 along a length thereof. The burner elements are located in the opening 24 formed by the base member 12 and are parallel to one another with the small holes 27 thereof extending upward. The tubular burner elements 26 are closed at one end and at the other end thereof are provided with an inlet port. Each of the inlet ports of the elements 26 is connected to a respective outlet port of a respective mixing device 28 for mixing air with fuel such as natural gas. Each of the devices 28 is provided with an inlet port for intake of fuel and a pair of air intake ports with a regulating mechanism for regulating the amount of the air flowing into the devices. The devices 28 are conventional air gas mixing devices commonly available and are shown in detail in FIGS. 9 and 10. Each of the fuel inlet ports of the mixer devices 28 is connected through a respective fuel flow control valve 29 to the outlet port of an electrically operated master control valve 30, the inlet port of which is connected to a source of fuel 36. Ignition of the burner elements 26 is accomplished by electrical means. Each of the burner elements 26 is provided with a discharge electrode 31 spaced in proximity to a corresponding electrode 32 on the burner element. A large alternating voltage is provided across each of the pairs of electrodes 31 and 32 associated with each of the burner elements 26 to establish a spark thereacross which ignites the gas mixture flowing through the holes of the burner elements. The high voltage is applied by means of a transformer 33, the secondary winding of which is connected to the electrodes 31 and 32, and the primary of which is connected through a control switch 34 to a source of alternating voltage 35. The control switch 34 controls the operation of the master control valve 30 as well as the application of voltage to the transformer 33. Accordingly, whenever the control switch 34 is operated, ignition is available at the burner elements 26 to ignite any gas escaping from the burner elements. The individual control valve elements 29 controlling the gas flow to the individual burner elements 26 are useful in providing a balanced flow of gas to the elements 26 of the burner assembly and hence efficient heating of the hot exhaust gases flowing in the chimney formed by cylindrical wall member 14.

Figure 2:
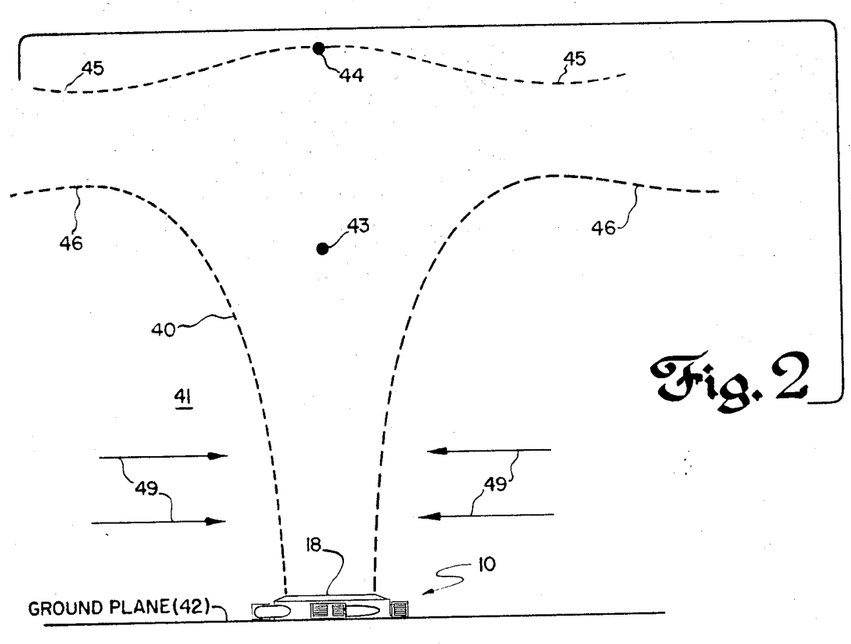
FIG. 2 shows a diagrammatic representation in cross section of a plume of hot exhaust gases emanating from a vertically oriented opening, such as in the cooling tower assembly of FIG. 1, into the colder atmosphere surrounding the earth.

The manner in which the combustor assembly 25 of FIG. 1 functions to augment the height to which the plume from the cooling tower assembly rises will be explained in connection with FIGS. 2, 3, and 4. Reference is now made particularly to FIG. 2 which shows the manner in which the plume 40 or column of hot air or other buoyant gases rise into a colder atmosphere 41 from the cooling tower assembly 10, such as shown in FIG. 1. In this figure, the cooling tower assembly 10 has a low profile, its overall height above a ground plane 42 may be quite small, for example, less than 100 feet and the diameter of the exhaust port 18 of the chimney thereof may be relatively large, for example greater than 200 feet, as described and claimed in the aforementioned patent application. Hot exhaust gases are continuously supplied to the exhaust opening 18. As the mass of exhaust gases displace ambient air which is heavier, the exhaust gases move upward into the atmosphere 41. The upward flow of exhaust gas causes an inward flow as indicated by the arrows 49 of cool ambient air which mixes with the rising exhaust gases and decreases its rate of rise. The exhaust gases rise to a height indicated by the point 43, where the diluted rising exhaust gases have displaced atmospheric air which equals the weight of the exhaust gases and which is referred to as the minimum or zero height of the plume 40. However, in reaching the height of point 43, the diluted exhaust gases have a certain momentum which carries them beyond the height represented by the height of point 43 to a height represented by the point 44 where the momentum of the exhaust gases is zero. The height represented by the point 44 is referred to as the maximum or momentum height of the plume 40. Between the zero buoyancy height 43 and the momentum height 44 of the plume 40, the gases thereof spread out in a horizontal direction and become dissipated and diffused into the surrounding atmosphere as shown by the horizontally extending upper lines 45 and the horizontal extending lower lines 46.

In accordance with the present invention, the provision of the combustor assembly 25 to the cooling tower assembly as shown and described in connection with FIG. 1 augments both the zero buoyancy height and the momentum height of the plume emitted from the opening 18 of the tower assembly. The extent of increase of the zero buoyancy height and the momentum height is dependent upon the extent of heating of the exhaust gases as will be explained and described in connection with the graphs of FIGS. 3 and 4.

The differential equations governing the behavior of hot gases issuing from a source into a colder atmosphere are set forth in an article entitled "Turbulent Gravitational Convection from Maintained and Instantaneous Sources" by R.B. Morton, Sir Geoffrey Taylor, and J.S. Turner in Proceedings of Royal Society London, Ser. A, V234, pages 1–23 (1956). In that article the three differential equations governing plume rise appear as equations of set 8 on page 7 and are the following:

$$dW/dx = 2 \alpha V. \qquad (1)$$

$$dV^4/dx = 4 FW. \qquad (2)$$

$$dF/dx = -2WG. \qquad (3)$$

In these equations the nomenclature is as follows:
- $x$ is the height above the opening from which the gases issue.
- $\alpha$ is the entrainment constant and represents the ratio of the velocity of ambient air into the plume to the upward velocity of the plume. The article assumes that the ratio is relatively constant and I have found it to be relatively constant at a valve of about 0.1.
- W is proportional to the mass flow passing a horizontal plane of the plume.
- $V^2$ is proportional to the momentum flow passing a horizontal plane of the plume.
- F is proportional to the buoyancy flow passing a horizontal plane of the plume.
- G is a function of the density gradient of the atmosphere.

Using the equations 1, 2 and 3 referred to above, I have calculated the zero buoyancy height to which a circular plume of hot air continuously emitted from an opening of circular cross section and exhausting thermal energy at a specified rate rises. In FIG. 3, to which reference is now made, three graphs 50, 51 and 52 of zero buoyancy height, each for a different initial velocity of exhaust from the exhaust opening of a chimney are shown in which the ordinate represents the height and the abscissa represents the rate of thermal exhaust from power plants of the capacities indicated. The conversion factor used is 7000 B.T.U. per hour per kilowatt of electrical capacity. The temperature rise in still atmosphere is assumed to be 4.65 % Farenheit per thousand feet of elevation. The ambient temperature at the exhaust opening is assumed to be 77°F. The exhaust gas temperature at the exhaust opening is assumed to be 92°F. Graph 50 represents the buoyancy or minimum height of the plume at an initial exhaust velocity from the exhaust opening of 12 feet per second. Graph 51 represents the buoyancy height of the plume of an initial exhaust velocity of 48 feet per second. Graph 52 represents the zero buoyancy height of the plume at an initial exhaust velocity of 192 feet per second. It was mentioned above that at the zero buoyancy height the gases in the plume have a certain momentum which carries the gases to a height referred to as the maximum or momentum height. The graph 60 represents the maximum height of the plume for the condition of initial velocity of exhaust gas at the exhaust opening of 192 feet per second. Also shown in long dash lines in FIG. 3 are graphs of circular exhaust openings of various diameters. Graphs 53, 54, 55, 56, 57, 58 and 59 represent exhaust openings of diameters in feet, respectively, of 11.8, 23.6, 47.1, 94.3 188.5, 377 and 754. The meaning of the data represented by the graphs will be clear from a specific example. For a power plant of 250,000 kilowatt capacity, as the diameter of the exhaust opening 18 is increased from 47.1 feet to 188.5 feet and the exhaust gas velocity decreased from 192 feet per second to 12 feet per second to maintain constant thermal exhaust, the zero buoyancy height is increased from 430 feet to 640 feet.

Figure 3:
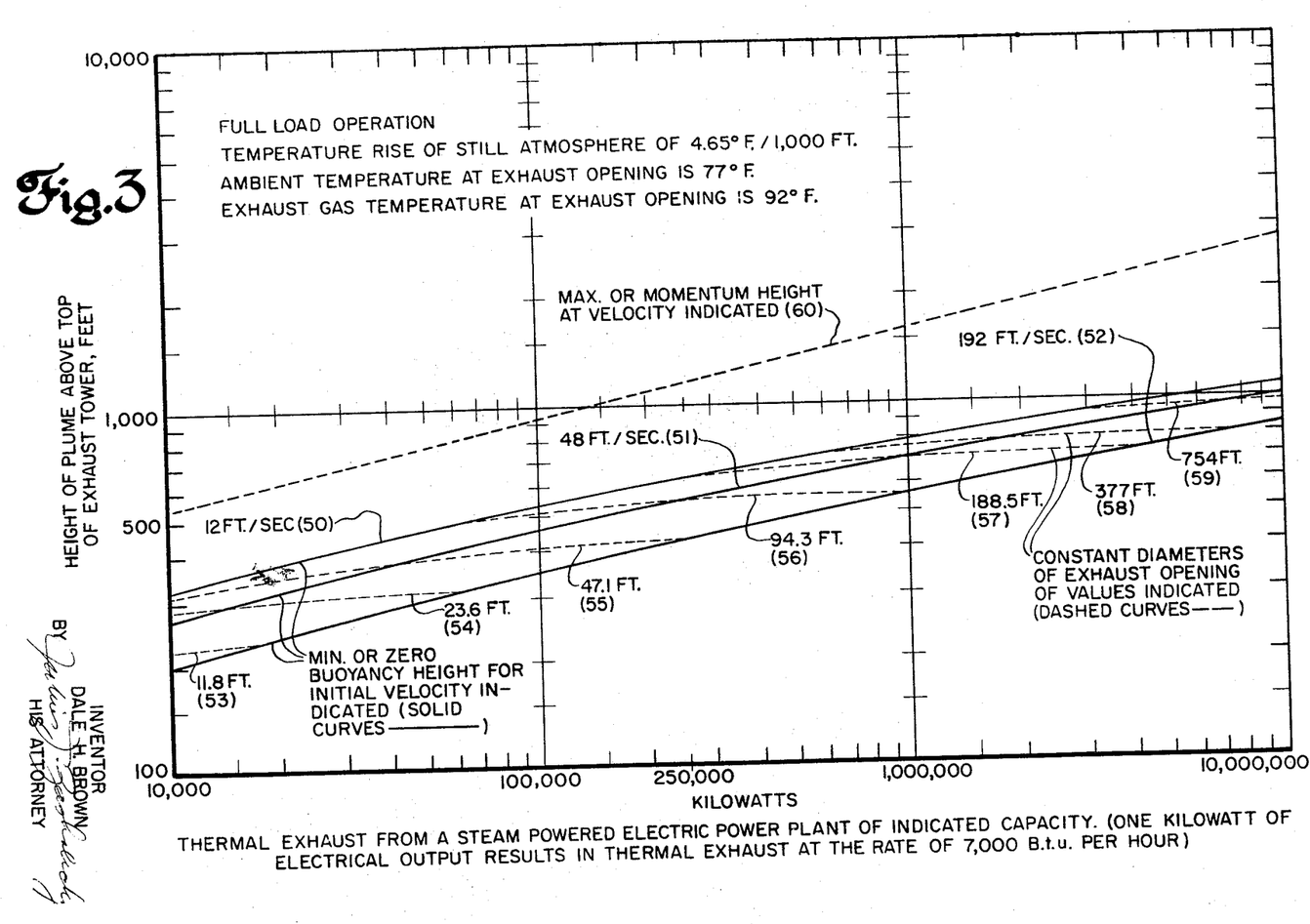
FIG. 3 shows a series of graphs of the manner in which minimum or zero buoyancy height of a plume varies with the thermal exhaust from power plants of increasing power generating capacity for various constant values of velocity of gaseous exhaust from the exhaust opening thereof and also shows another series of graphs of the manner in which the maximum or buoyancy height of a plume varies with thermal exhaust from power plants of increasing power generating capacity for various constant values of the diameter of the exhaust openings thereof.

If a smaller atmospheric temperature rise than 4.65 per thousand feet of elevation is assumed, the graphs of zero buoyancy height of FIG. 3 would be shifted upward depending on the extent of change of the temperature gradient. Also, if the thermal energy content per unit volume of exhaust is increased, the graphs of FIG. 3 mentioned above also would be shifted upward along the ordinate, i.e., because of the greater energy content of the exhaust gas, the momentum heights and the buoyancy heights would be greater.

Figure 4:
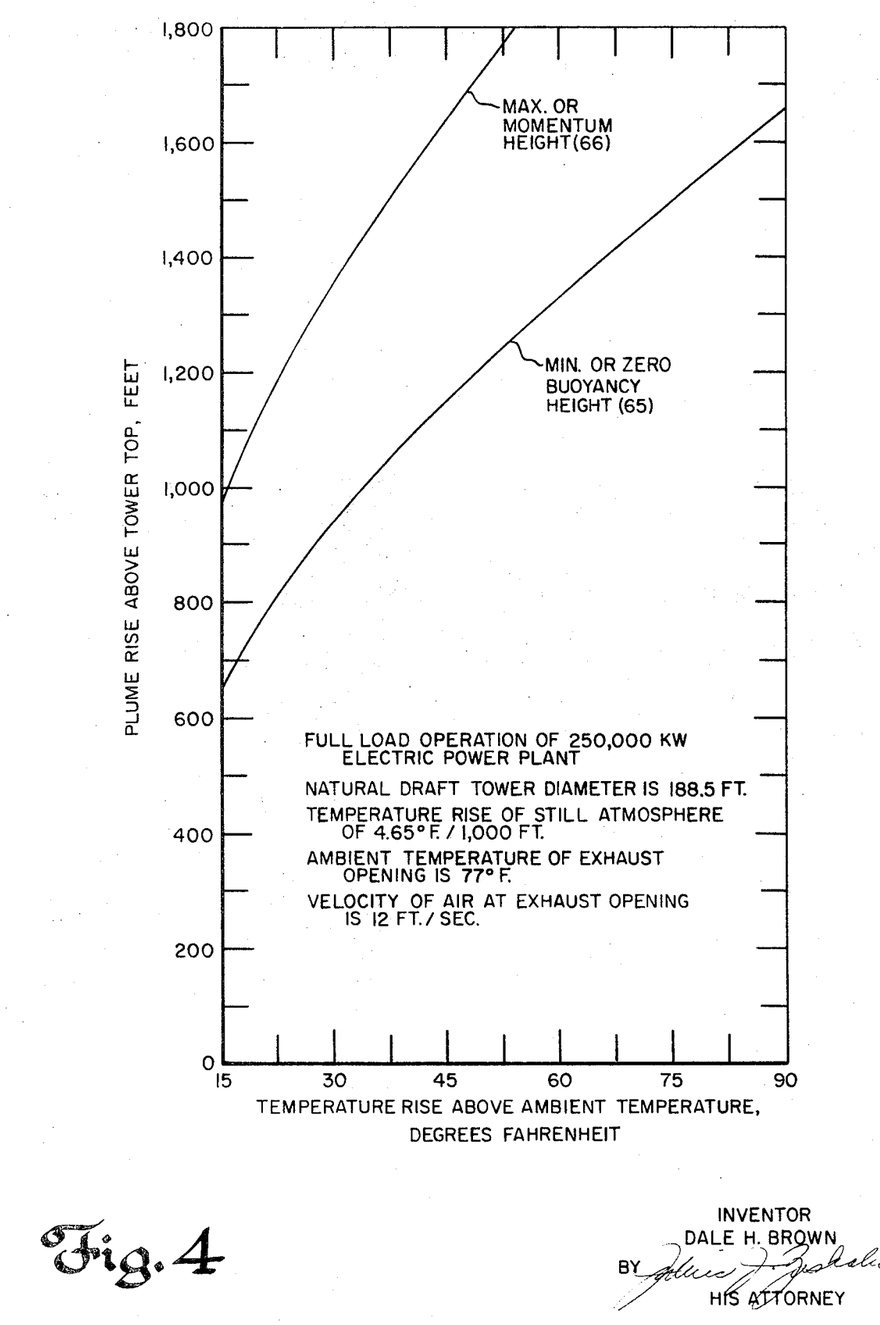
FIG. 4 includes a pair of graphs, one of which shows the manner in which the minimum or buoyancy height of a plume varies with increasing temperature of exhaust from a chimney and the other of which shows the maximum or momentum height of a plume varies with increasing temperature of exhaust from a chimney.

FIG. 4 shows a pair of graphs, one of which illustrates the manner in which minimum or zero buoyancy height of a plume varies with increasing temperature of the exhaust gases and the other of which illustrates the manner in which the maximum or momentum height of a plume varies with increasing temperature of the exhaust gases. The height of rise of the plume above a tower or chimney is plotted along the ordinate and the temperature rise of exhaust gases above an ambient temperature of 77°F is plotted along the abscissa. Graph 65 represents the zero buoyancy or minimum height of the plume as a function of temperature difference of exhaust gas over ambient temperature. Graph 66 represents the maximum or momentum height of the plume as a function of temperature difference over ambient temperature. The graphs 65 and 66 are calculated in the same manner as the graphs of FIG. 3. The graphs are calculated for a circular exhaust opening of 188.5 feet in diameter, for an initial velocity of exhaust gases at the exhaust opening of 12 ft./sec., for a temperature rise of still atmosphere of 4.65° F per 1000 feet, and an ambient temperature at the exhaust opening of 77°F. The exhaust temperature at the opening in the absence of any thermal augmentation is assumed to be 92°F or 15°F above ambient temperature, that is, the tower is designed for a 15°F rise above ambient in the absence of thermal augmentation in accordance with the present invention.

From the graph of FIG. 4 it is seen that the zero buoyancy height of the plume, in the absence of thermal augmentation is 640 feet and the momentum height of the plume is 970 feet. With thermal augmentation by the burner assembly such as shown in FIG. 1 in which the temperature difference between the temperature of the plume and the ambient is 30°F, the zero buoyancy height of the plume is 940 feet and the maximum or momentum height of the plume is 1350 feet. Accordingly, it is seen that increasing the diameter of the exhaust opening from 47.1 feet to 188.5 feet increases the zero buoyancy height from 430 feet to 640 feet, approximately 50 percent. Also, it is seen that increasing the thermal input into the exhaust to raise its temperature another 15°F over ambient temperature increases the zero buoyancy height from 640 feet to 970 feet, approximately another 50 percent. In the latter example the momentum height is also increased by a comparable percentage.

In cooling tower assemblies as well as in other assemblies such as smoke stacks from which hot gases are exhausted into the atmosphere, it is important to elevate the exhaust gases to a sufficient altitude where atmospheric currents dilute and disperse them to regions remote from the source. Accordingly, the minimum or buoyancy height of the plume is an important height which represents the minimum altitude to which the exhaust gases will rise and from my observations and calculations will rise some distance beyond that point due to the fact that the exhaust gases of the plume have some momentum at the minimum altitude. Between the minimum and maximum altitude or height points the gases spread outward. In the aforementioned application, the buoyancy and the momentum height of the plume are increased by the provision of exhaust openings of increased diameter. Such a provision will assure that the plume will rise to a certain height under given atmospheric conditions. Under certain conditions of extreme temperature inversion, the zero buoyancy height and the maximum height of plume rise will be lower than under average conditions. The extreme temperature inversion may be in the form of a very large temperature rise per 1000 feet of atmosphere and also may extend for a considerably altitude into the atmosphere. Such extreme conditions do not occur frequently; however, when they do occur it is important to be able to elevate the gases beyond the altitude of the extreme inversion. Even a design of a tower having a particularly large diameter may not provide adequate plume rise. The combustor assembly 25 provides a means which may be used to raise the exhaust gases in the tower through the most extreme temperature inversions. As can be seen in the graphs of FIG. 4 and as pointed out above that at temperature rise of 30°F over ambient temperature, both the minimum and the maximum heights of the plume are increased approximately 50 percent over their values for a temperature rise of 15°F over ambient temperature for which the tower as designed without thermal augmentation.

Figure 5:
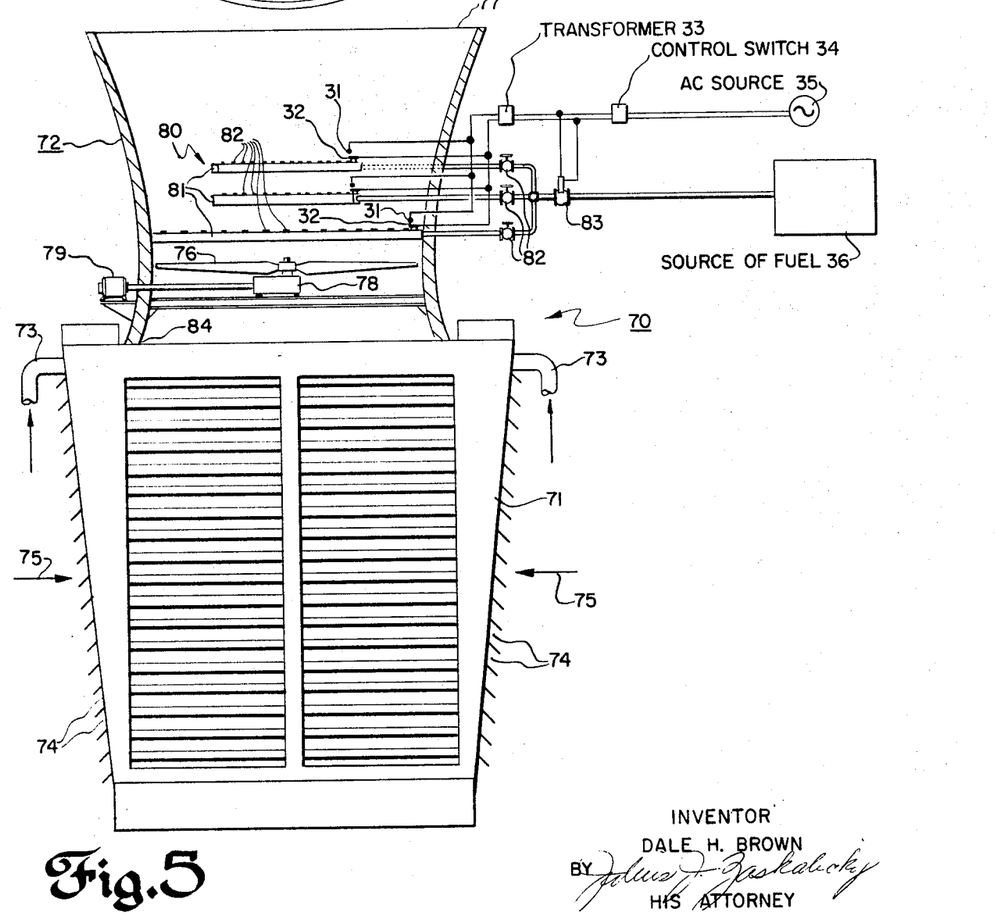
FIG. 5 shows an elevation view of another embodiment of the present invention.
Figure 6:
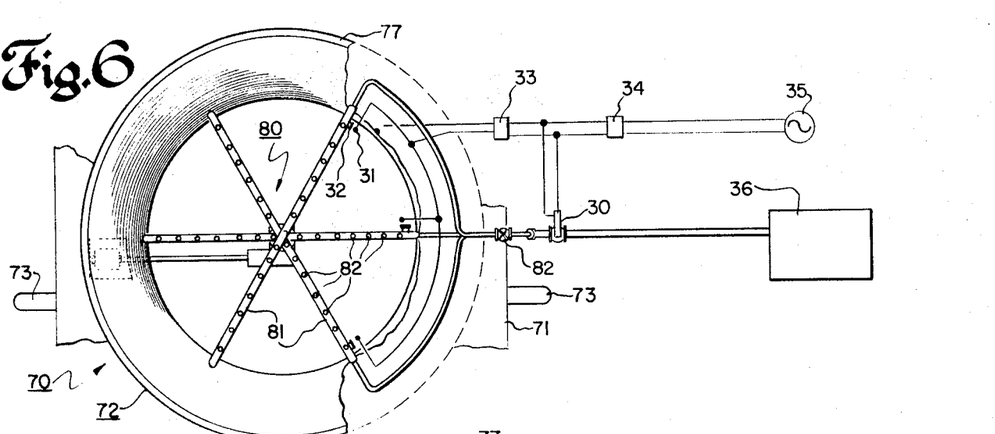
FIG. 6 shows a plan view of the embodiment of FIG. 5.

Reference is now made to FIGS. 5 and 6 which illustrate the present invention as applied to an induced draft cross flow cooling tower assembly 70. The basic tower structure shown is conventional and may be such as provided by the Marly Company of Kansas City, Missouri. The tower assembly 70 includes a base portion 71 and a chimney or stack portion 72. Fill (not shown) in the form of splash bars on which water from supply pipes 73 is splashed is located in the base portion 71. Opening 74 are provided in the sides of the base portion through which ambient air enters as indicated by arrows 75. The ambient air cools the water flowing down through the splash bars by convection as well as by evaporation. The resultant warm moist air moves upward into the chimney portion 72 where a fan 76 is provided to augment the velocity of the rising air and to discharge it through the top opening 77 of the chimney. The fan 76 is actuated by a gear reduction assembly 78 which in turn is driven by an electric motor 79 mechanically coupled to the gear reduction assembly.

In accordance with the present invention, thermal energy augmentation is provided to the air flow in the chimney portion by means of a combustor assembly 80. The combustor assembly includes three generally elongated burner elements 81, each supported at a different height in the chimney and each displaced 60° from adjacent elongated burner elements to provide the uniform circumferential disposition of the burner elements. Each of the burners has a plurality of small holes 82 located along the length of the tube and facing upward. The tubular burner elements 81 are closed at one end and at the other end thereof are provided with an inlet port. Each of the inlet ports of each of the burner elements 81 is connected through a respective duct and flow control valve 82 to the outlet port of an electrically operated master control valve 83. The master control valve has an inlet port connected to a source of fuel 36 such as gas. Ignition of the burner elements 81 is accomplished by electrical means identical to the means shown and described in connection with FIG. 1. Elements of FIGS. 5 and 6 identical to elements of FIG. 1 are identically designated. Ignition of the fuel flowing from the holes 82 of the burner elements 81 is accomplished by means of a pair of sparking electrodes 31 and 32 associated with each of the burner elements. One electrode 32 is located on the burner element 81 itself, the other electrode 31 is spaced therefrom. A large alternating voltage is applied across each of the pairs of electrodes 31 and 32 to produce a spark discharge thereacross which ignites the gas flowing from the burner elements. If the air flow in the chimney is not adequate to support the combustion of the fuel gases from the burner elements, burner elements which are supplied with fuel properly mixed with air such as described in connection wtih FIG. 1 may be used. Each pair of the electrodes 31 and 32 is connected to the secondary of the transformer 33, the primary of which is connected through a control switch 34 to a source 35 of alternating current. The load end of the switch 34 also actuates the master control valve 83. Accordingly, whenever the switch 34 is actuated to establish combustion in the burner assembly, the control valve 83 is opened to permit fuel to flow to the burner assembly and concurrently therewith a spark is established to ignite the fuel flowing to the burner elements. The valves 82 in each of the lines from the inlet ports of the burner elements 81 are provided to adjust the flow in the burner elements to provide a balance flow of fuel and hence a balanced combustion of the gases therein. Location of the burner assembly 80 adjacent the air inlet end 84 of the cooling tower provides a certain amount of natural draft as well as thermal augmentation in the system.

Figures 7, 9, 10:
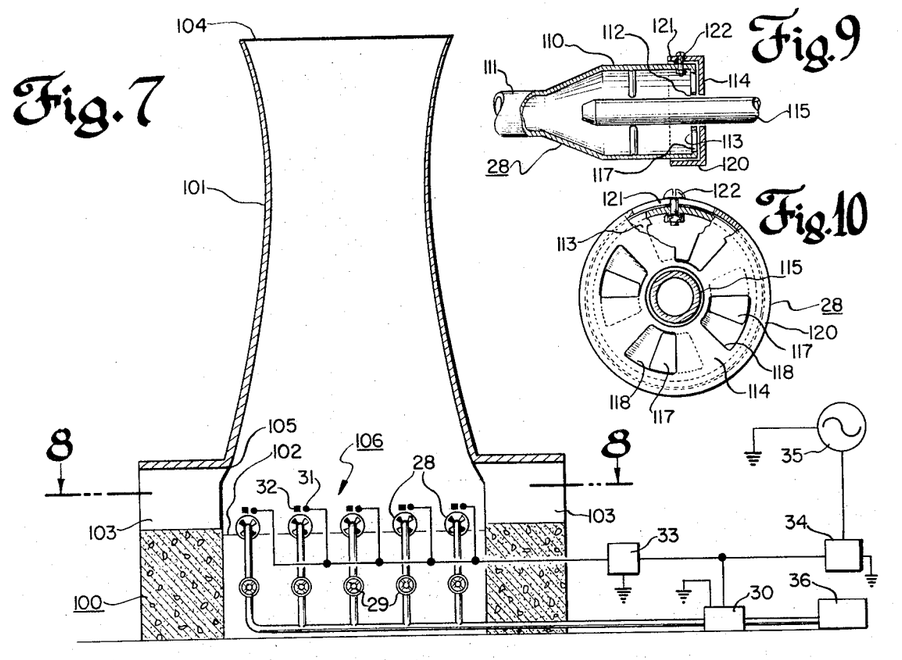
FIG. 7 shows an elevation view of still another embodiment of the present invention.
FIG. 9 is a side view in section of a gas and air mixer device used in the embodiments of FIGS. 1, 7 and 8.
FIG. 10 is an end view of the device of FIG. 9.
Figure 8:
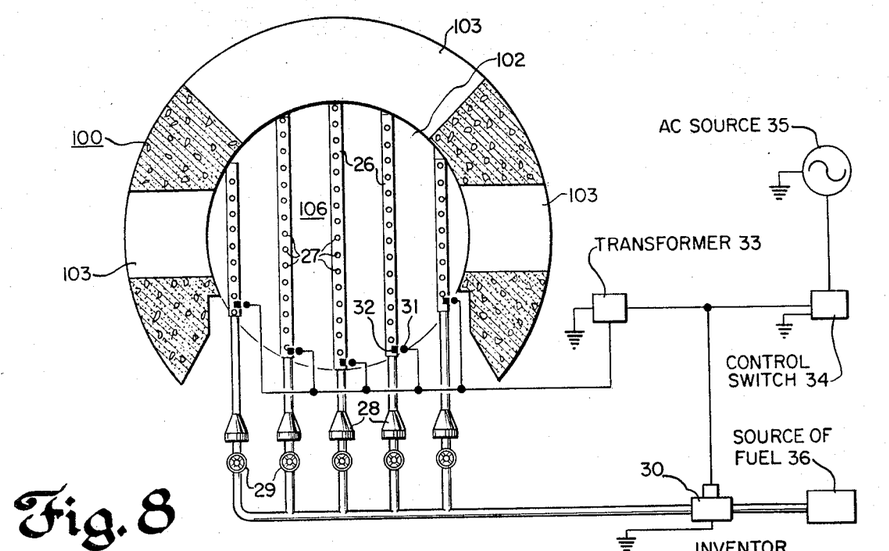
FIG. 8 shows a plan view of the embodiment of FIG. 7.

Reference is now made to FIG. 7 which shows an elevation view in section of another embodiment of the present invention as applied to a chimney stack for the exhaust of industrial gases to the atmosphere. FIG. 8 is a sectional view of the embodiment of FIG. 7 taken along section lines 8—8 thereof. The elements of FIGS. 7 and 8 which are identical to the elements shown in FIG. 1 are denoted by the same symbol. In these figures there is shown a base structure 100 and a chimney 101 of considerable height supported thereon. The base structure is provided with an internal platform 102 and has apertures 103 in the side thereof through which gases to be exhausted to the atmosphere are applied, for example, by ducting (not shown). Such hot gases normally applied through such ducting to the apertures 103 of the chimney rise by virtue of the greater buoyancy of the gases thereof. The flow of exhaust gases through the chimney creates a draft which produces a suction at the apertures 103 and hence exhaust gases are drawn into the lower opening 105 of the chimney and discharged at the upper opening 104 thereof. In accordance with the present invention, the combustor assembly 106 is situated on platform 102 at the bottom of the chimney. The combustor assembly is identical to the combustor assembly of FIG. 1 and functions in the same manner to add thermal input to the exhaust gases to increase their buoyancy and hence to heights to whch they rise.

Reference is now made to FIG. 9 which shows a side view of the gas and air mixer device 28 of FIG. 1, and to FIG. 10 which shows an end view of the air and gas intake portion of the mixer device. The device 28 consists of a housing 110 cylindrical in form having an outlet port 111 and an inlet side which is provided with a pair of disks 113 and 114. Plate 113 is secured fixedly to the housing 110 and has central opening 112 for a fuel inlet duct 115 and four similar openings 117 spaced uniformly about the central opening 112. The matching plate 114 with four matching openings 118 is similar in form to the fixed plate 113 and is located in abutting relationship to the end plate 113. The plate 114 is movable about a central axis of housing 110 to vary the extent of registry of the openings 118, four in number, thereof with the openings 117 of plate 113 to control the amount of air entering the mixing chamber of the housing for a given flow of gas in the inlet duct 115 thereof. The movable matching plate 112 is secured to the end of a cylindrical member 120 rotatably mounted on the housing 110. The cylinder 120 is provided with a slot 121 extending partially about the circumference of the cylindrical member 120. A screw member 122 extending through the slot 121 and threaded into a nut welded to the housing locks the cylindrical member 120 and hence the air intake adjustment plate 114 in position after a proper setting has been attained.

While the invention has been described in specific embodiments, it will be appreciated that modifications may be made by those skilled in the art and I intend by the appended claims to cover all such modifications and changes as fall within the true spirit and scope of the invention.

What I claim as new and desire to secure by Letters Patent of the United States is:

1. In combination: a vertically disposed chimney defined by a vertical wall member encompassing a vertical central opening terminating in a discharge opening at the top of said wall member, a base member at the bottom of said wall member forming a closure at the bottom of said vertical central opening, said vertical wall member having at least one inlet opening therein located between the top and bottom of said wall member, a plurality of fuel burners located in said central opening below said inlet opening and distributed over said base member, a source of fuel located outside said central opening beyond said wall member, means for conducting fuel from said source to said burners, at least one cooling tower including a hot air exhaust port, said cooling tower being located adjacent said vertical wall member outside said central opening with said exhaust port communicating with said central opening through said inlet opening in said vertical wall member.

2. The combination set forth in claim 1 wherein hot air is enabled to enter said central opening through said inlet opening from said exhaust port in a flow direction which is generally crosswise of the flow direction of upwardly directed combusted fuel from said plurality of burners below the hot air flow, wherein said vertical central opening is generally cylindrical and said discharge opening is generally circular, and wherein the ratio of the diameter of said circular discharge opening to the vertical height of said cylindrical central opening is at least unity.

* * * * *